No. 709,774. Patented Sept. 23, 1902.
H. H. KAGEY.
MILKING SHIELD.
(Application filed Apr. 21, 1902.)
(No Model.)
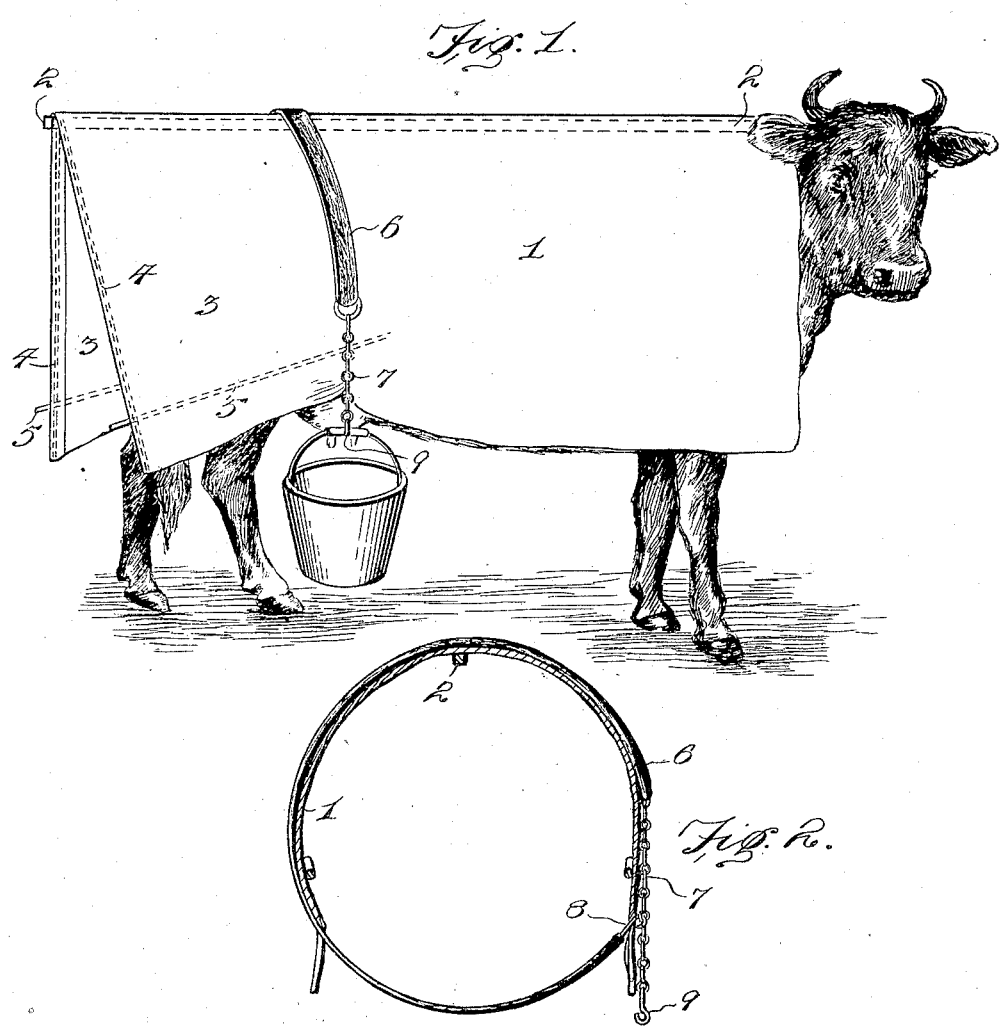
Witnesses
O. M. Simpson
J. W. Garner
H. H. Kagey, Inventor
by C. A. Snow & Co.
Attorneys

UNITED STATES PATENT OFFICE.

HENRY H. KAGEY, OF ASHLAND, OHIO.

MILKING-SHIELD.

SPECIFICATION forming part of Letters Patent No. 709,774, dated September 23, 1902.

Application filed April 21, 1902. Serial No. 103,998. (No model.)

*To all whom it may concern:*

Be it known that I, HENRY H. KAGEY, a citizen of the United States, residing at Ashland, in the county of Ashland and State of Ohio, have invented a new and useful Milking-Shield, of which the following is a specification.

My invention is an improved milking-shield adapted for use when milking a cow to prevent her from switching the milker with her tail and also adapted to support the bucket; and it consists in the peculiar construction and combination of devices hereinafter fully set forth and claimed.

In the accompanying drawings, Figure 1 is a perspective view of my improved milking-shield, showing the same in operative position on a cow. Fig. 2 is a transverse sectional view of the same.

In the embodiment of my invention I provide a flexible cover 1, which may be made of any suitable fabric or may be a netting and which is of sufficient breadth to cover the back and sides of a cow's body and of sufficient length to extend rearwardly from the cow a foot or more. The said flexible cover passes over a supporting-bar 2, which may be made of wood or any other suitable material and extends along the cow's back, the rear end of the said bar projecting rearwardly from the cow and supporting the rearwardly-projecting flaps 3 of the flexible cover. Thereby the cow's tail is confined between the said flaps. The latter are stiffened at their rear and lower sides by rods 4 5, respectively, which may be stitched into or otherwise suitably secured to the flaps, and the said rods may be made of pieces of wire or metallic rods of suitable length and thickness. By thus stiffening the rear flaps of the cover the same serve to prevent the cow from switching the milker with her tail, as will be readily understood. I also provide a girth 6, which is placed on the outer side of the cover and is adapted to pass around and under the cow's body at a suitable point. The said girth, as here shown, includes a chain 7, which is attached to one end thereof and is adapted to be engaged by a hook 8 at the opposite end of the girth, so that the latter may be fitted as closely around the cow's body as may be necessary, and the said chain is here shown as provided with a depending hook 9 to support the bucket used in milking. Hence the said bucket will be carried by the cow, the milker is relieved of the weight thereof, the necessity of placing the bucket on the ground below the cow is obviated, and in the event that the cow should step forwardly or kick while being milked the bucket will not be overturned.

I do not desire to limit myself to the precise construction and combination of devices hereinbefore described, as it is evident that modifications may be made therein without departing from the spirit of my invention.

Having thus described my invention, I claim—

1. A bar adapted to lie on the back and extend in rear of an animal, a flexible cover, doubled over the bar, and also extending in rear of the animal, thereby forming rearwardly-extended flaps, the latter being stiffened, for the purpose set forth, and a girth passed around the cover and the body of the animal, substantially as described.

2. A milking-shield comprising a flexible cover adapted to lie on and extend in rear of the animal, means to support the rearwardly-extended portion of said cover and means to stiffen the rearwardly-extended portion of said shield or cover, substantially as described.

3. A milking-shield comprising a supporting-bar adapted to lie on the back of and extend in rear of the animal, and a flexible cover doubled over said bar and adapted to extend in rear of the animal, the flaps thus formed by the rearwardly-extended portion of the cover being stiffened, substantially as described.

In testimony that I claim the foregoing as my own I have hereto affixed my signature in the presence of two witnesses.

HENRY H. KAGEY.

Witnesses:
 E. R. BALLIET,
 J. C. ROBINSON.